US005089830A

United States Patent [19]

Cha et al.

[11] Patent Number: 5,089,830

[45] Date of Patent: Feb. 18, 1992

[54] DEVICE FOR CONTROLLING MOISTURE IN A VIDEO COLOR PRINTER AND A METHOD THEREFOR

[75] Inventors: Dong-Ill Cha; Guen-Yong Park, both of Kyounggi, Rep. of Korea

[73] Assignee: SamSung Electronics Co., Ltd., Kyung, Rep. of Korea

[21] Appl. No.: 557,765

[22] Filed: Jul. 26, 1990

[30] Foreign Application Priority Data

Sep. 23, 1989 [KR] Rep. of Korea ................ 1989-13722

[51] Int. Cl.[5] ......................... G01D 9/00; B41J 2/365; B41J 29/377

[52] U.S. Cl. ................................ 346/1.1; 346/76 PH; 346/25; 400/719; 400/120

[58] Field of Search ..................... 346/76 PH, 25, 1.1; 400/120, 719

[56] References Cited

FOREIGN PATENT DOCUMENTS 0240485 11/1985 Japan .............................. 346/76 PH
0233268 10/1987 Japan .

OTHER PUBLICATIONS

Bohnhoff et al, "Automatic Temperature and Humidity Compensation for Currents of a Thermal Print Head", IBM Bulletin, vol. 27, No. 9, 2/85, pp. 5191-5193.

*Primary Examiner*—Benjamin R. Fuller
*Assistant Examiner*—Huan Tran
*Attorney, Agent, or Firm*—Robert E. Bushnell

[57] ABSTRACT

There is disclosed a video color printer having a thermal print head, a hue gradation controller, a moisture detector disposed between the thermal print head and the hue gradation controller for detecting the moisture existing inside the printer, and a fan motor, so that when the amount of the moisture detected exceeds a predetermined value, all of the heat radiation bodies of the thermal print head are heated, and the fan motor is driven so as to blow heated air thus to eliminate the moisture.

9 Claims, 5 Drawing Sheets

DEVICE FOR CONTROLLING MOISTURE IN A VIDEO COLOR PRINTER AND A METHOD THEREFOR

TECHNICAL BACKGROUND OF THE INVENTION

The present invention relates generally to a moisture control device for controlling the moisture existing inside a video printer so as to prevent deterioration of the printing quality.

Generally, when recording a video signal on a recording paper, sublimated thermal transcription is employed, in which the hue gradations may be freely and precisely expressed and therefore a full color recording may be achieved.

A known recording mechanism of the sublimated thermal transcription employed in a video printer, includes a thermal print head (T.P.H), a color ribbon, a recording paper, and a platen drum, wherein the recording paper is rotated three times during which the three dyes of yellow (Y), magenta (M) and cyan (C) coated on the color ribbon are thermally sublimated depending upon the magnitude of a video signal applied to the T.P.H, thus deposited on the recording paper. In this conventional process, the rise of the surface temperature of the T.P.H. considerably affects the amount of the heat radiated from the heating bodies of the T.P.H., and therefore the surface temperature should be detected to correct the temperature, as will be described with reference to FIG. 1 and FIGS. 2A–2C.

Referring to FIG. 1, the input video signal is converted into a digital signal by analog/digital converter 10 to be delivered as the output to a hue gradation controller 20 that controls the amount of the heat radiated from the heating bodies of the T.P.H. depending upon the magnitude of the input video signal. In this case, the surface temperature of the base of the T.P.H. 30 is detected serving as the reference signal for controlling the amount of the heat radiated. Further, since the surface temperature of the base of the T.P.H. 30 is high, a fan motor is driven to lower the surface temperature.

Referring to FIG. 1 and FIGS. 2A–2C, there is illustrated the operations and disadvantages of the conventional video color printer. In particular, FIG. 2B illustrates the changes of the recording concentration with relation to the surface temperatures of the base of the T.P.H. 30, in which a line 31 represents a characteristic of the conventional video color printer and a line 33 represents an ideal characteristic. In other words, as the operation time increases the heat radiated from the T.P.H. 30 will accumulate, which causes the printing error.

In FIG. 2C, there is described the changes of the surface temperature of the base of the T.P.H. 30 with respect to the recording time in case of an A6 size sheet, for example. Thus, it will be noted that an increase in of the surface temperature of the base of the T.P.H. directly affects the recording concentration. Hence, the amount of the heat radiated from the T.P.H. 30 is controlled in accordance with the result of the temperature detection by controlling the pulse width modulation (PWM) signal detected at the T.P.H. 30 to correct the temperature.

In such a conventional video printer, only the surface temperature of the base of the T.P.H. is corrected, and the influences of moisture are never taken into account. Hence, if the video printer works in an environment having excess moisture, fine particles of water migrate through the surfaces of the color ribbon, the recording paper, the platen drum, as well as inside the printer which directly affects the printing quality, so that the recording paper is not only slid when supplied to the printer, but also the printing quality is considerably affected.

SUMMARY OF THE INVENTION

Accordingly, an object of the present invention is to provide a device for controlling the moisture by driving a fan to vaporize moisture formed in a video printer.

Another object of the present invention is to provide a device for removing the moisture by giving a preliminary heat.

According to the present invention, a video color printer includes a thermal print head, a hue gradation controller, a moisture detector disposed between the thermal print head and the hue gradation controller for detecting the moisture existing inside the printer, and a fan controller, so that when the amount of the moisture detected exceeds a predetermined value, all of the heat radiation bodies of the thermal print head are heated, and the fan motor is driven so as to blow heated air thus to eliminate the moisture.

The present invention will now be described with reference to the drawings attached only by way of example.

BRIEF DESCRIPTION OF THE ATTACHED DRAWINGS

FIG. 1 is a block diagram of a conventional video printer;

DETAILED DESCRIPTION OF A SPECIFIC PREFERRED EMBODIMENT

Figure 13:
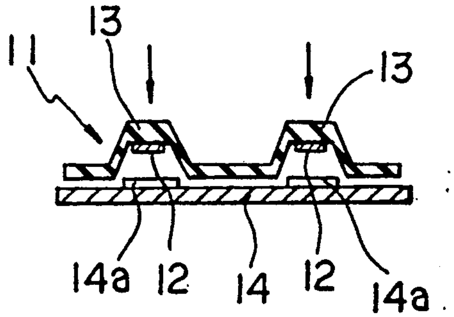
Figure 2A:
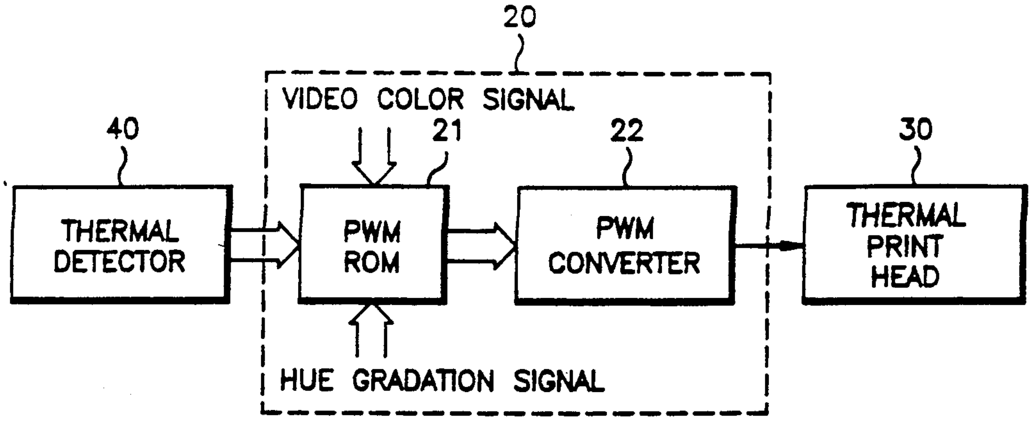
FIG. 2A illustrates a detailed view of a hue gradation controller of FIG. 1.
Figure 2B:
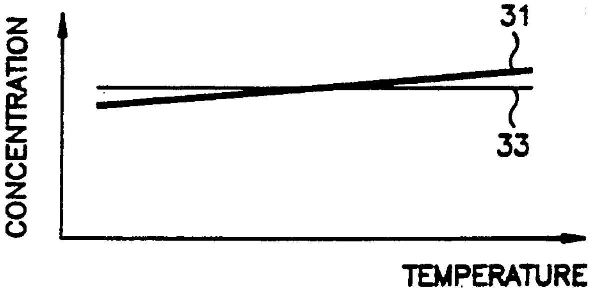
FIGS. 2B and 2C illustrate the characteristics of the recording concentration according to the temperature and the accumulation of the heat.
Figure 2C:
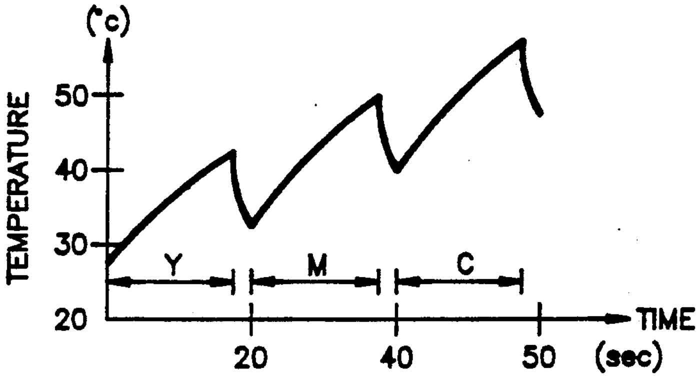
Figure 3:
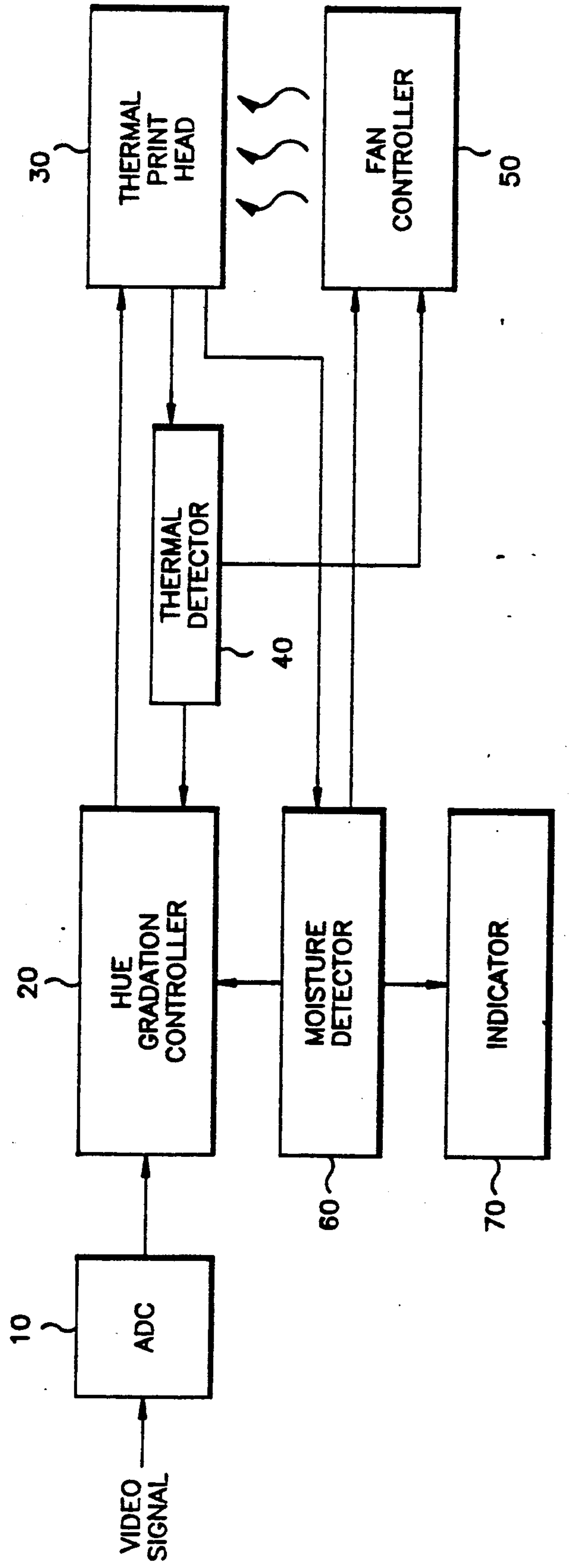
FIG. 3 is a block diagram of the inventive structure.

Referring to FIG. 3, an analog-to-digital converter (ADC) 10 converts video signals applied from a video controller (not shown) into digital signals. The digitalized video signals are provided to a hue gradation controller 20, at which the video signals are analyzed into various hue gradations. Then, a thermal print head 30 connected to the hue gradation controller 20, prints on a recording paper the video signals in response to the control signal output from the hue gradation controller 20.

A thermal detector coupled to the thermal print head 30 so as to receive a temperature signal, detects the heat radiated from the thermal print head 30 and feeds back the heat detection signal to the hue gradation controller 20. In the mean time, the heat detection signal output from the thermal detector 40 is provided also to a fan controller 50 so as to vaporize the moisture in the video printer by blowing air. The hue gradation controller 20 continually corrects the hue gradations applied to the thermal print head 30 in response to the heat feed-back signal output from the thermal detector 40.

Meanwhile, a moisture detector 60 is positioned at an ideal location (preferably, in close proximity of the thermal head 30) to detect the moisture gathered in the video color printer. Similar to the thermal detector 40, the moisture detection signal output from the moisture detector 60 will also be fed back to the hue gradation controller 20 and, at the same moment, provided to the fan controller 50 and an indicator 70 for indicating whether or not the video printer is now performing the function of moisture elimination. The moisture feed-back signal output from the moisture detector will be used to correct the hue gradations influenced due to the excessive moisture.

Figure 4:
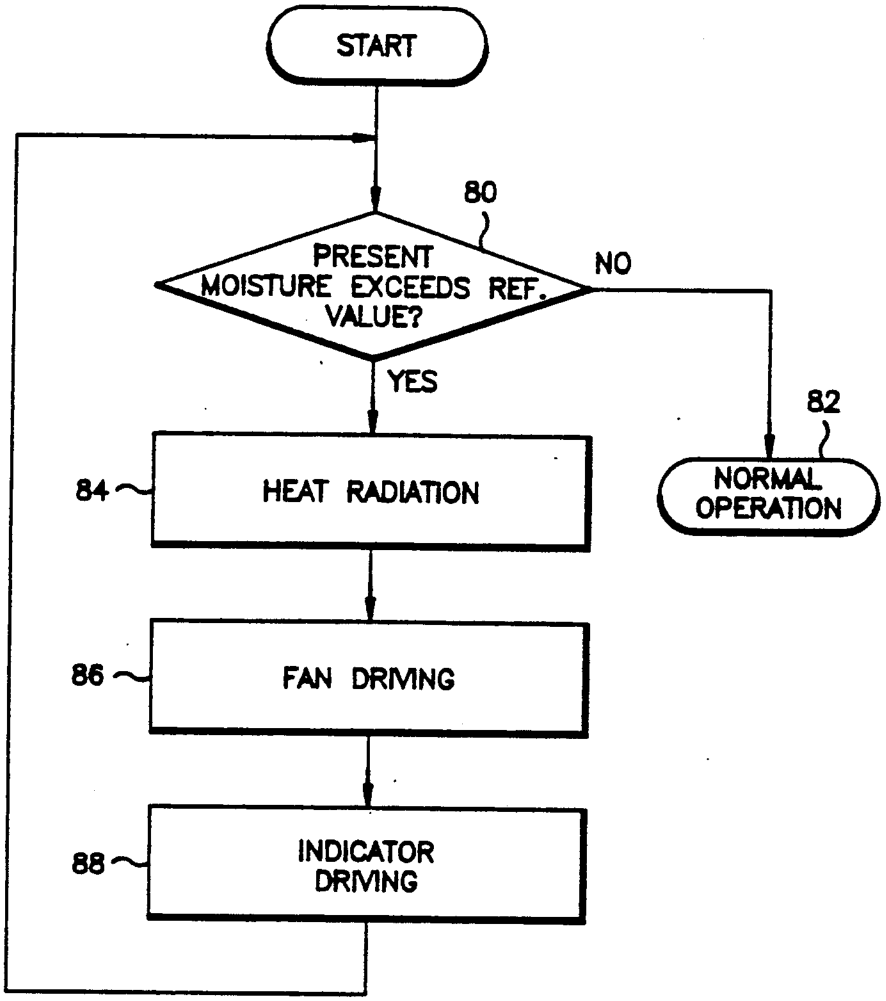
FIG. 4 is a flow chart of the moisture controlling process according to the present invention.

In FIG. 4, the operation of the inventive video color printer is described with reference to a flow chart. First, the present moisture detected by the moisture detector 60 is checked in step 80 to determine whether it exceeds a reference value established in advance. In the case that the present moisture is below the reference value, then step 82 for implementing the normal operation will be executed. If, however, the present moisture is above the reference value, then the thermal print head 30 of the video printer will make a preliminary heat in step 84, to vaporize the moisture.

In sequence, in step 86 the fan controller 50 generates a fan control signal to drive the fan (not shown), thereby vaporizing the moisture inside the video color printer. Then, the indicator 70, coupled to the moisture detector 60, will display the present operational status thereonto.

Figure 5:
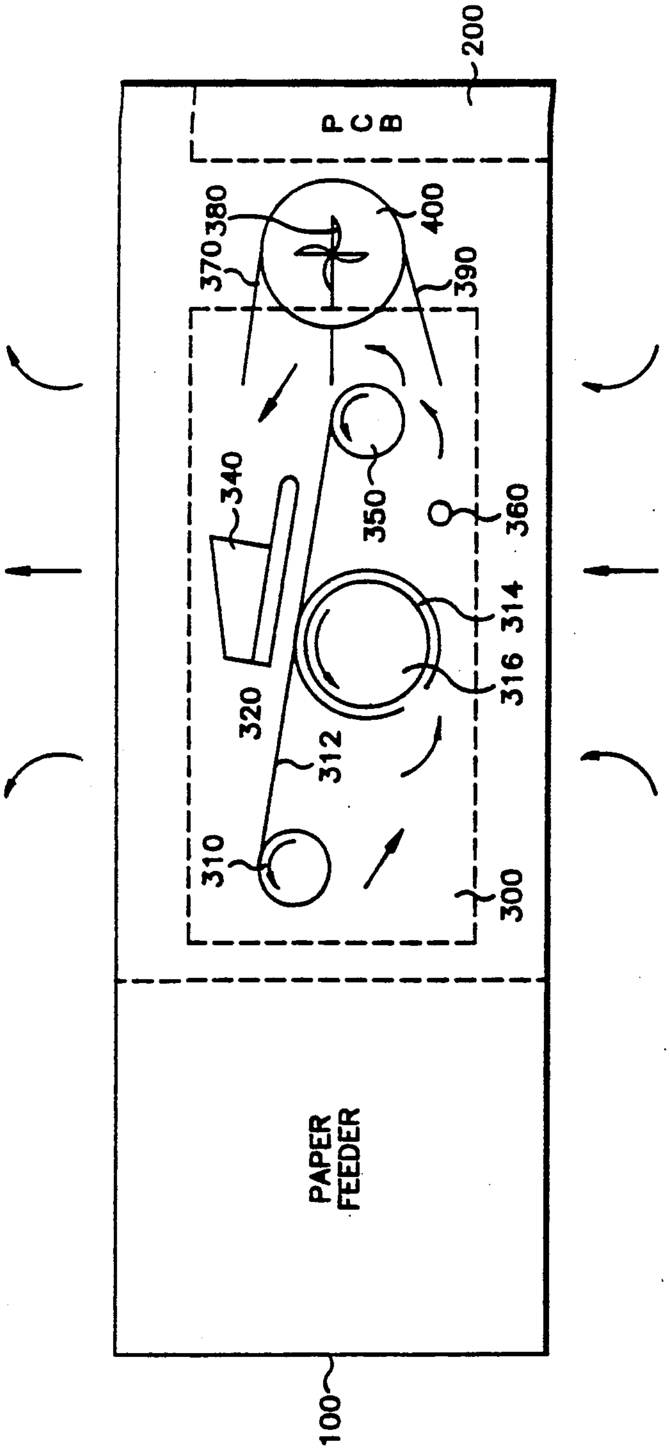
FIG. 5 is a schematic diagram for illustrating the elimination moisture according to the present invention.

Referring to FIG. 5, a moisture sensor 360 is mounted inside the printing mechanism 300 having the thermal print head 320, color ribbon 312, recording paper 314, and platen drum 316 so as to sense the moisture existing around the platen drum 316. It is well known that the moisture, as explained before, considerably affects the printing quality.

If the moisture detected by the moisture sensor 360 exceeds the reference value, the video printer stops printing and performs the moisture elimination process as shown in FIG. 4. Namely, if the moisture exceeds the reference value in step 180, operation of the hue gradation controller 20 according to the input video signal is temporarily stopped and the thermal print head 320 is controlled to make heat generation instead of the printing operation in step 84. Then, in the step 86, the fan motor (not shown) is driven to homogeneously transmit the heat generated from the thermal print head 320, thus reducing the moisture inside the mechanism 300 below the reference value. At this time, the printing function may not be performed, and therefore the indicator 70 is driven to indicate that the printer is performing the function of moisture elimination.

Thus, according to the present invention, if the moisture inside the printer is detected as exceeding a predetermined value, the moisture elimination function is automatically performed, so as to prevent the deterioration of the printing quality.

The foregoing description shows only a preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A device for controlling hue gradations, temperature and moisture in a video color printer having a fan, said device comprising:

means for controlling said fan;

a thermal print head for radiating heat in response to a video signal and a moisture sensing signal;

hue gradation control means coupled to aid thermal print head, for controlling said hue gradations of said video signal in response to said video signal, said moisture sensing signal and a heat sensing signal;

heat sensing means for detecting the temperature of said thermal print head and for providing said heat sensing signal to said hue gradation control means and to said means for controlling said fan in response to said detected temperature; and moisture detector means for detecting moisture within said video color printer for providing said moisture sensing signal to said means for controlling said fan to vaporize said moisture and to said hue gradation control means for controlling said hue gradations, for controlling said video color printer to stop printing when said moisture is detected to be greater than a predetermined reference value, and for controlling said thermal print head to generate a preliminary heat to vaporize said moisture.

2. A device as claimed in claim 1, further comprising means coupled to said hue gradation control means, for converting said video signal into a digital signal.

3. A device for controlling moisture within a video color printer, comprising;

a fan;

means for controlling said fan;

a thermal print head for radiating heat in response to a video signal;

a thermal detector for monitoring temperature level of said thermal print head and for providing a heat signal indicative of said temperature level;

a moisture detector for monitoring moisture level within said video color printer and for providing a moisture signal indicative of said moisture level;

hue gradation control means coupled to said thermal print head so as to provide a hue gradation control signal to said thermal print head in response to said heat signal and said moisture signal, for controlling said heat radiated by said thermal print head, for controlling said video color printer to stop printing when said moisture level is detected to be greater than a predetermined reference level, and for controlling said thermal print head to generate a preliminary heat to vaporize said moisture when said moisture level is detected to be greater than said predetermined reference level.

4. The device of claim 3, further comprising:

means for supplying said heat signal to said fan controlling means.

5. The device of claim 3, further comprising:

means for supplying said moisture signal to said fan controlling means.

6. A method for controlling moisture in a video color printer comprising a thermal print head and a fan, said method comprising the steps of:

monitoring temperature of said thermal print head and generating a temperature detection signal;

monitoring said moisture in said video color printer and generating a moisture detection signal;

determining if said moisture detection signal is indicative of said moisture exceeding a predetermined reference value;

preventing said video color printer from printing if it has been determined that said moisture is greater than said reference value;

controlling said thermal print head to generate an initial heat to vaporize said moisture when it has been determined that said moisture is greater than said reference value;

controlling said fan to vaporize said moisture when it has been determined that said moisture is greater than said reference value; and driving an indicator to alert a user that said moisture is being controlled in said video color printer.

7. The method as claimed in claim 6, further comprising the steps of:

controlling hue of a color video signal applied to said video color printer in response to said temperature detection signal; and controlling said fan in response to said temperature detection signal.

8. The method as claimed in claim 6, further comprising the step of:

controlling hue of a color video signal applied to said video color printer in response to said moisture detection signal.

9. The method as claimed in claim 6, further comprising the steps of:

controlling hue of a color video signal applied to said video color printer in response to said temperature detection signal;

controlling hue of a color video signal applied to said video color printer in response to said moisture detection signal; and controlling said fan in response to said temperature detection signal and said moisture detection signal.

* * * * *

UNITED STATES PATENT AND TRADEMARK OFFICE

CERTIFICATE OF CORRECTION

PATENT NO. : 5,089,830

DATED : February 18, 1992

INVENTOR(S) : Dong-Ill CHA, et al

It is certified that error appears in the above-identified patent and that said Letters Patent is hereby corrected as shown below:

Col. 1, line 58, delete "of"

Col. 3, line 48, delete "the" (first occurrence)

Col. 4, line 7, replace "aid" with --said--

Signed and Sealed this

Eighteenth Day of May, 1993

*Attest:*

Michael K. Kirk

MICHAEL K. KIRK

*Attesting Officer*

*Acting Commissioner of Patents and Trademarks*